June 20, 1961 R. L. WHITE 2,989,702
ELECTRONIC GENERATOR OF SYMBOLS OR CHARACTERS OR THE LIKE
Filed April 3, 1958 8 Sheets-Sheet 1

RICHARD L. WHITE
INVENTOR.

BY
ATTORNEY.

June 20, 1961   R. L. WHITE   2,989,702
ELECTRONIC GENERATOR OF SYMBOLS OR CHARACTERS OR THE LIKE
Filed April 3, 1958   8 Sheets-Sheet 2

RICHARD L. WHITE
INVENTOR.

BY
ATTORNEY.

June 20, 1961 R. L. WHITE 2,989,702
ELECTRONIC GENERATOR OF SYMBOLS OR CHARACTERS OR THE LIKE
Filed April 3, 1958 8 Sheets-Sheet 3

RICHARD L. WHITE
INVENTOR.

BY
ATTORNEY

June 20, 1961  R. L. WHITE  2,989,702
ELECTRONIC GENERATOR OF SYMBOLS OR CHARACTERS OR THE LIKE
Filed April 3, 1958  8 Sheets-Sheet 4

RICHARD L. WHITE
INVENTOR.

BY
ATTORNEY.

June 20, 1961 R. L. WHITE 2,989,702
ELECTRONIC GENERATOR OF SYMBOLS OR CHARACTERS OR THE LIKE
Filed April 3, 1958 8 Sheets-Sheet 5

RICHARD L. WHITE
INVENTOR.

BY

ATTORNEY.

June 20, 1961  R. L. WHITE  2,989,702
ELECTRONIC GENERATOR OF SYMBOLS OR CHARACTERS OR THE LIKE
Filed April 3, 1958  8 Sheets-Sheet 6

RICHARD L. WHITE
INVENTOR.

BY
ATTORNEY.

June 20, 1961  R. L. WHITE  2,989,702
ELECTRONIC GENERATOR OF SYMBOLS OR CHARACTERS OR THE LIKE
Filed April 3, 1958  8 Sheets-Sheet 7

RICHARD L. WHITE
INVENTOR.

BY
ATTORNEY.

June 20, 1961 R. L. WHITE 2,989,702
ELECTRONIC GENERATOR OF SYMBOLS OR CHARACTERS OR THE LIKE
Filed April 3, 1958 8 Sheets-Sheet 8

RICHARD L. WHITE
INVENTOR.

BY
ATTORNEY.

United States Patent Office 2,989,702
Patented June 20, 1961

2,989,702
ELECTRONIC GENERATOR OF SYMBOLS OR CHARACTERS OR THE LIKE
Richard L. White, Skokie, Ill., assignor to Hoffman Electronics Corporation, a corporation of California
Filed Apr. 3, 1958, Ser. No. 726,240
18 Claims. (Cl. 328—32)

This invention is directed to novel circuits for the generation of voltage waveforms which, when applied to a cathode ray tube, produce symbols or characters, such as Arabic numerals, on the face of the cathode ray tube.

With the increasing use of electronic instrumentation and computers the need for a digital readout device which is simple and inexpensive becomes quite imperative. A number of edge lighted digital readouts are available commercially. However, these devices suffer from confusion of numbers as a result of ambient light diffusion. Certain special cathode ray tubes utilizing shaped grids are also commercially available but are extremely expensive. A system utilizing a conventional cathode ray tube but very complex circuitry is described at page 72 of the Electronics Engineering edition for January 3, 1958. The circuitry described in that article relies upon Fourier synthesis to obtain the desired numbers and the requirements placed upon the components, such as the precisely wound transformers, pose distinct problems of both a technical and an economical nature.

Therefore, it is an object of this invention to provide a relatively low cost, high reliability circuit combination capable of generating from a voltage source of a single frequency waveforms which, when applied to a conventional cathode ray tube, will produce desired symbols or characters.

It is a further object of this invention to provide simplified circuitry for the generation of waveforms which, when applied to conventional cathode ray tubes, will produce highly legible Arabic numerals.

According to the present invention, voltages from a single frequency, center tapped, sine wave source are modified and combined in a predetermined desired fashion within a network having only passive elements such as resistors, condensers and diodes to provide a pair of electrical waves having shapes such that when one of the waves is applied to the vertical plates and the other to the horizontal plates of an associated conventional cathode ray tube, a desired character, such as an Arabic numeral, appears on the face of the cathode ray tube.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which;

Figure 1:
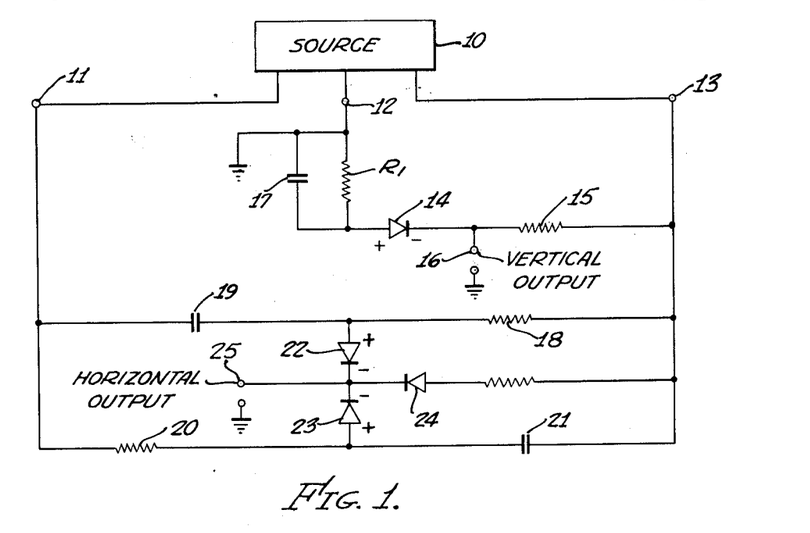
FIGURE 1 is a schematic diagram for generating horizontal and vertical voltage waveforms for producing the numeral "2."
Figure 3:
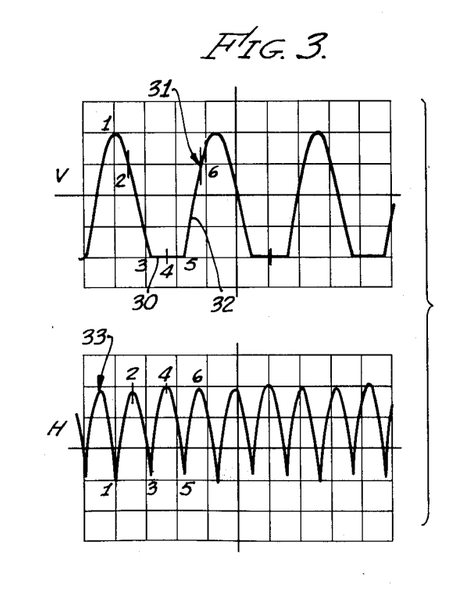
FIGURE 3 is a graphical representation of certain voltage waveforms obtained from the circuit of FIGURE 1.

In FIGURE 1, source 10 provides to input terminals 11, 12 and 13 a pair of sine waves 180° out of phase. Terminal 12 is the common terminal and is grounded. Source 10 may be a transistorized or vacuum oscillator or may be simply a center-tapped transformed connected to the A.-C. mains. During the period when the sine wave voltage appearing at terminal 13 is in its positive half cycle, the potential applied to diode 14, which may be of the vacuum tube or semiconductor variety, is such that diode 14 remains cut off and, except for a slight drop in voltage across resistor 15, the full half-sine wave voltage occurring at terminal 13 appears at vertical output terminal 16. When the sign of the potential appearing at terminal 13 goes negative sufficiently to overcome the voltage stored on condenser 17 as a result of current flow through resistor $R_1$ during the previous negative half cycle, diode 14 begins to conduct current and the negative half-sine wave is clipped as shown in region 30 of waveform 31 in FIGURE 3. When the negative half-sine wave falls below the voltage required to overcome the clamping voltage on condenser 17 and the necessary voltage drop across diode 14 to produce conduction, diode 14 ceases to conduct and essentially the full sine wave voltage appearing at terminal 13 also appears at output terminal 16. The output voltage at terminal 16 takes the form shown in region 32 of waveform 31 in FIGURE 3.

The voltage waveform for application to the horizontal plates of an associated cathode ray tube when generating the numeral "2" is a composite of three sine waves, two involving phase shifting of the sine wave from the source and the third being an unshifted sine wave. Resistor 18 and condenser 19 comprise one phase shifting network while resistor 20 and condenser 21 comprise the other phase shifting network. Diodes 22, 23, and 24 are poled so as to pass only the positive half-sine wave voltages to output terminal 25. The composite waveform appearing at terminal 25 is shown by curve 33 of FIGURE 3.

Figure 2:
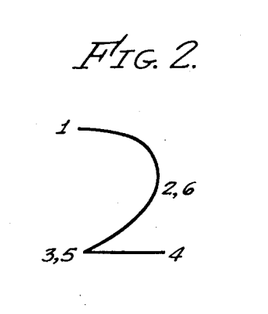
FIGURE 2 is a diagram showing the steps in the synthesis of the numeral "2" utilizing signals from the circuit of FIGURE 1.

The sequence in which the various segments of the numeral "2" are formed by the electron beam of the cathode ray tube to which the waveforms 31 and 33 are applied is shown in FIGURE 2. The upper portion 1, 2 of the numeral "2" in FIGURE 2 is formed by segments 1, 2 of the two voltage waveforms 31 and 33 in FIGURE 3. Similarly, the segment 2, 3 of the numeral is formed by segments 2, 3 of the vertical and horizontal waveforms shown in FIGURE 3. The horizontal bottom line 3, 4 is formed by the segments 3, 4 of the vertical and horizontal waveforms shown in FIGURE 3. It will be noticed that the vertical waveform has a plateau in this region maintaining a constant vertical deflection voltage. The base line of the numeral "2" is retraced by the electron beam moving from point 4 to point 5 as a result of the vertical and horizontal deflection voltage waveforms shown between points 4 and 5 in FIGURE 3. Once again, the vertical deflection voltage is maintained constant while the horizontal voltage is moving along a portion of the sinusoid. The upper portion 5, 6, 1 is a simple retracing of the original curve 1, 2, 3 and results from the voltage waveforms shown between points 5, 6 and 1 in FIGURE 3. The retracing process may be eliminated, if desired, and the beam carried directly back to the starting point, 1, but blanking of the beam during this period would be necessary and the blanking circuitry required to accomplish the desired end is complex and unnecessary if accurate retracing is effected. The phase shift effected by the networks 18, 19 and 20, 21 is approximately 120°.

Figure 4:
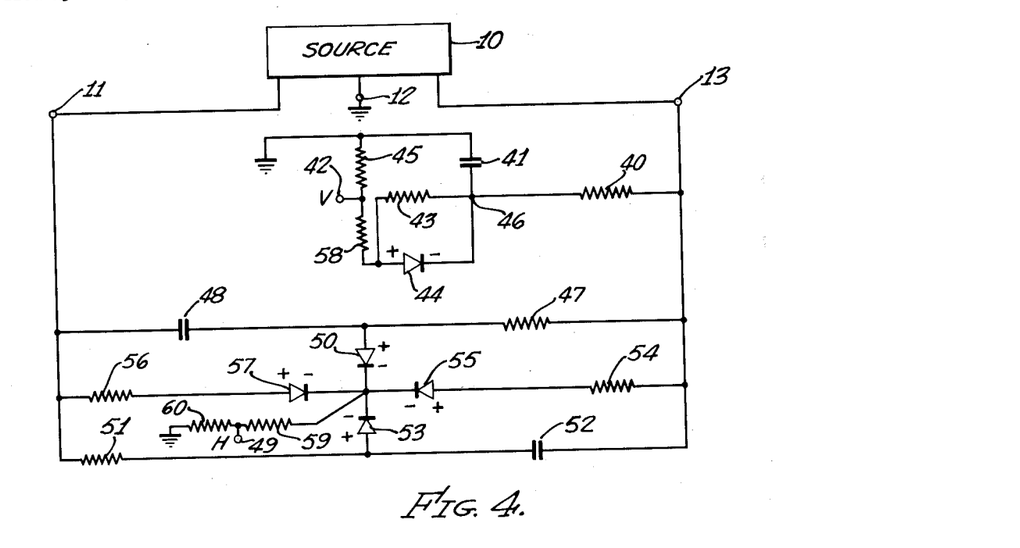
FIGURE 4 is a circuit diagram for generating voltage waveforms to produce the numeral "3."

In FIGURE 4, source 10 provides two sine waves of the same frequency but 180° out of phase, one to each of the terminals 11 and 13, respectively, and ground terminal 12. The sine wave voltage appearing at terminal 13 is phase shifted by the combination of resistor 40 and condenser 41. The amplitude of this phase-shifted signal appearing at vertical deflection voltage output terminal 42 is determined by the voltage divider network made up of resistor 43, which is shunted by diode 44, and resistor 58 in series with resistor 45. When the sign of the voltage appearing at terminal 13 is positive, the diode 44 is open circuited and the voltage appearing at point 46 is divided by the combination of resistors 43, 58 and 45 producing a phase-shifted sine wave of reduced amplitude at output terminal 42. When the sign of the voltage appearing at terminal 13 is negative, diode 44 conducts, short-circuiting resistor 43 and putting the full potential appearing at point 46 on the combination of resistors 58 and 45, which may be provided, if desired, to set the amplitude of the output signal at a desired level. The results of this action can be seen by referring to curve 60 in FIGURE 6.

The horizontal voltage waveforms comprise two voltages which are phase shifted approximately 90° and two unphase-shifted voltages each 180° out of phase with the other. More specifically, the voltage applied to terminals 11 and 13 is phase shifted by the combination of resistor 47 and condenser 48 and applied to horizontal voltage output terminal 49 through diode 50 and a voltage divider network comprising resistors 59 and 60, which may be provided, if desired, to set the amplitude of the output signal at a desired level. At the same time the voltage applied to terminals 11 and 13 is shifted in the opposite direction by resistor 51 and condenser 52 and applied to output terminal 49 through diode 53 and the same, optional, voltage divider network. The voltage sine wave appearing between terminals 13 and 12 is applied unshifted through resistor 54 and diode 55 and through the voltage divider network to output terminal 49. At the same time the sine wave voltage appearing between terminals 11 and 12 is applied, unshifted, through resistor 56 and diode 57 and the voltage divider network to output terminal 49. The diodes 50, 53, 55 and 57 are poled so as to pass only the positive portions of the various unshifted and shifted sine waves thus producing the horizontal voltage waveforms shown in curve 61 of FIGURE 6.

Figure 5:
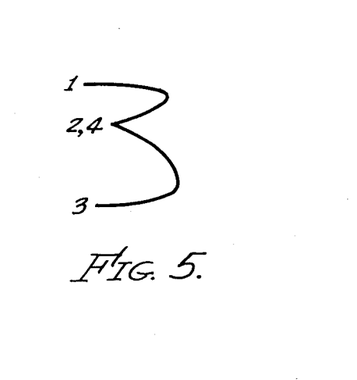
FIGURE 5 is a graphical representation of the steps in the synthesis of the number "3."
Figure 6:
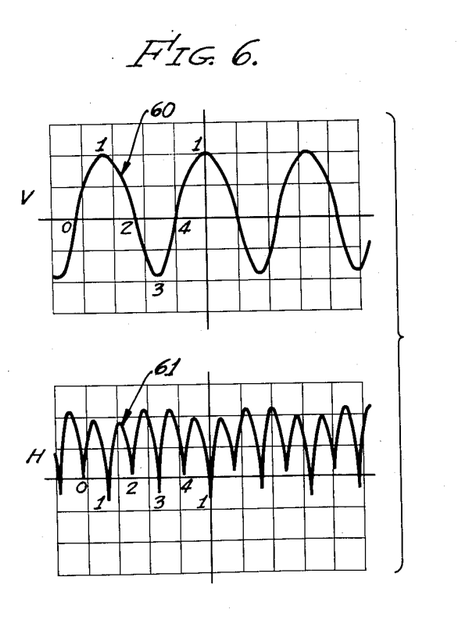
FIGURE 6 is a graphical representation of the voltage waveforms generated by the circuit of FIGURE 3.

The fashion in which the application of vertical waveform 60 and horizontal waveform 61 to an associated cathode ray tube traces out the numeral "3" can be more thoroughly understood by noting the correspondingly numbered segments in the numeral "3" shown in FIGURE 5 and in the voltage waveforms shown in FIGURE 6. It is to be noted that the cusps at points 0, 2 and 4 in curve 61 of FIGURE 6 occur above the zero voltage axis, whereas the cusps at points 1, 3 and 1 fall approximately at the zero axis. As the vertical voltage waveform moves from point 1 to 2, which is from approximately 90° to 180° along a sine wave curve, the horizontal voltage waveform moves from approximately 45° to 135°, corresponding to points 1, 2 on the horizontal wave form shown in curve 61. This traces out the upper portion of the numeral "3." As the vertical deflection voltage waveform moves from point 2 to point 3 which is approximately from 180° to 270° on the sine wave curve, the horizontal voltage waveform has another segment from approximately 45° to 135°, tracing the lower curved portion of the numeral "3" in FIGURE 5. The process is reversed to get back to point 1. Blanking may be used if desired instead of reversing the process.

Purely by way of example, the components in the circuit of FIGURE 4 may have values as follows:

| | |
|---|---|
| Resistor 40 | 82,000 ohms. |
| Resistor 43 | 220,000 ohms. |
| Resistor 58 | 150,000 ohms. |
| Resistor 45 | 180,000 ohms. |
| Condenser 41 | 0.04 mfd. |
| Diode 44 | Type 1N222. |
| Resistor 47 | 150,000 ohms. |
| Condenser 48 | 0.02 mfd. |
| Resistor 51 | 120,000 ohms. |
| Condenser 52 | 0.02 mfd. |
| Resistor 54 | 68,000 ohms. |
| Resistor 56 | 68,000 ohms. |
| Resistor 59 | 68,000 ohms. |
| Resistor 60 | 330,000 ohms. |
| Diodes 50, 53, 55 and 57 | Type 1N222. |
| Source 10 | 60 cycle sine wave source of voltage sufficient to deflect the beam in associated cathode ray tube. |

Figure 7:
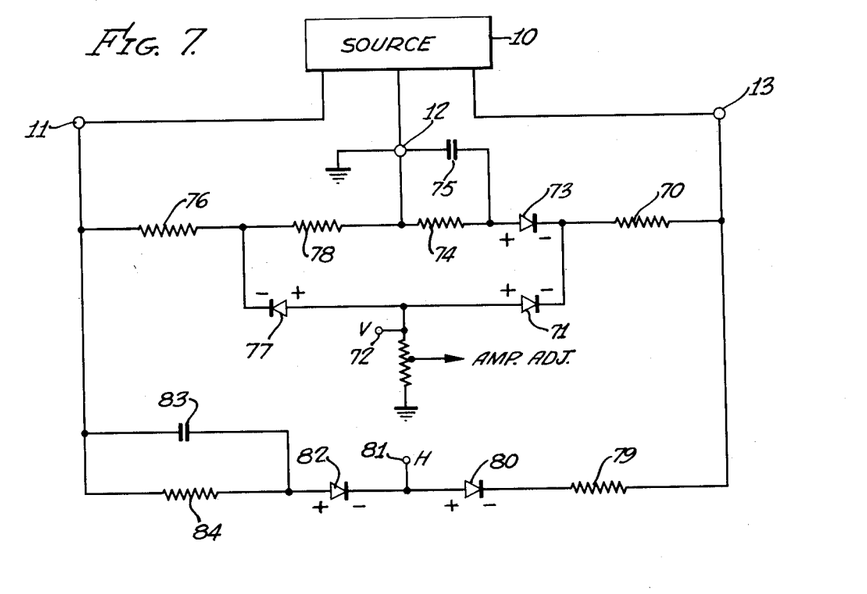
FIGURE 7 is a schematic diagram of the circuit for producing the waveforms necessary to generate the number "4."

The circuit for generating the numeral "4" is shown in FIGURE 7. This circuit does not rely upon any phase shifting. Terminal 13 is connected through resistor 70 and diode 71 to vertical deflection voltage output terminal 72. Terminal 13 is also connected through resistor 70, diode 73 and resistor 74 to grounded terminal 12. Resistor 74 is shunted by condenser 75. Input terminal 11 is connected through resistor 76 and diode 77 to vertical deflection voltage output terminal 72. The junction between resistor 76 and diode 77 is connected to grounded terminal 12 through resistor 78.

The vertical deflection voltage circuit operates as follows. Resistors 76 and 78 act as a voltage divider and apply a predetermined portion of the potential appearing between terminals 11 and 12 to diode 77. Diode 77 is poled so that only the negative half-sine waves of voltage will pass to output terminal 72. The positive half-sine wave voltage appearing at terminal 13 is prevented from appearing at output terminal 72 by the polarity of diode 71 during the negative half-sine wave of voltage from terminal 13. Diode 73 has a tendency to conduct but cannot do so until the amplitude of the negative voltage exceeds the bias applied to the anode of diode 73 by the combination of resistor 74 and condenser 75. When that bias or clamping voltage is overcome by the increased negative amplitude of the voltage wave from terminal 13, diode 73 conducts, causing current flow into condenser 75, effectively short-circuiting resistor 74 and flattening the peak of the negative half-sine wave as shown at segment 0, 2 on curve 90 in FIGURE 9.

Figure 8:
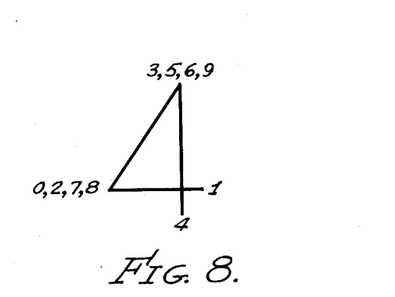
FIGURE 8 is a diagram showing the steps in the synthesis of the numeral "4."
Figure 9:
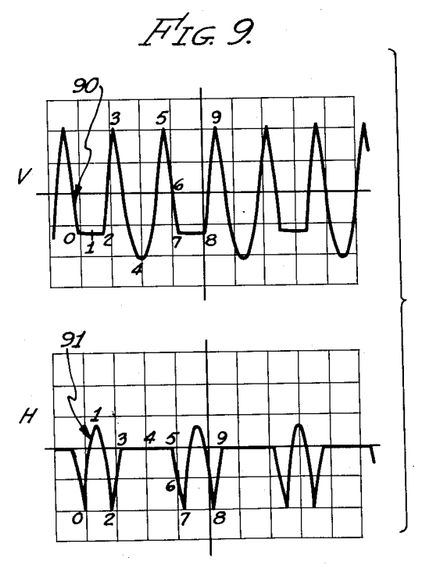
FIGURE 9 is a graphical representation of the voltage waveforms generated by the circuit of FIGURE 7.

Turning to the horizontal deflection voltage generating circuit, the voltage appearing at terminal 13 is applied through resistor 79 and diode 80 to horizontal deflection voltage output terminal 81. Diode 80 is poled so that only the negative half-sine wave from terminal 13 appears at output terminal 81. On the other hand, diode 82 is poled so that only the positive voltages appearing at terminal 11 can appear at output terminal 81. However, the entire positive half-sine wave appearing at terminal 11 cannot reach output terminal 81 because of the potential stored across clamping condenser 83 which shunts resistor 84. When the voltage at terminal 11 rises beyond the negative clamping voltage applied to diode 82 by the combination of condenser 83 and resistor 84, diode 82 conducts, current flows into condenser 83 essentially short-circuiting resistor 84 and applying to output terminal 82 directly the positive-going voltage appearing at terminal 11. This produces the segment 0, 1 in the horizontal deflection voltage waveform, curve 91 of FIGURE 9. As the sine wave voltage at terminal 11 passes through its positive peak and falls below the cutoff point of diode 82, the portion 1, 2 of curve 91 in FIGURE 9 is traced. At that point the negative half-sine wave from terminal 13, which is now falling towards the zero axis takes over and the portion 2, 3 on curve 91 is traced. The steps by which the numeral "4" of FIGURE 8 is traced can be determined by matching the segments shown in FIGURE 8 with the correspondingly numbered segments in curves 90 and 91 of FIGURE 9.

Figure 10:
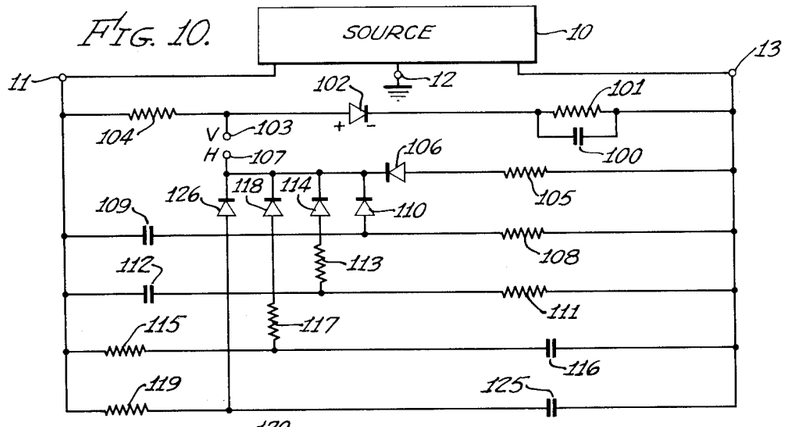
FIGURE 10 is a schematic diagram of the circuit for producing the voltage waveforms necessary to generate the numeral "5."

Turning now to the circuitry for generating the voltage waveforms necessary to produce, when applied to the deflection plates of an associated cathode ray tube, the numeral "5," in FIGURE 10 input terminal 13 is connected through a clamping circuit comprising condenser 100 and resistor 101 and through diode 102 to vertical deflection voltage output terminal 103. Input terminal 11 is coupled through resistor 104 to vertical deflection voltage output terminal 103. As indicated earlier, the voltages appearing at terminals 11 and 13 are sine waves of the same frequency but of opposite phase. It is to be noted that diode 102 is poled so that during the time when the voltage of terminal 13 is negative with respect to ground, substantially the entire voltage appearing at terminal 13 would be applied to output terminal 103 were it not for the existence of the bias generating or clamping network comprising resistor 101 and condenser 100. The bias which appears across resistor 101 and, hence, which is applied to diode 102 is a result of the discharge of condenser 100 through resistor 101 during the time when the voltage at terminal 13 is positive with respect to the voltage at terminal 11. When the voltage at terminal 11 is positive and exceeds the potential at terminal 13 by an amount sufficient to overcome the bias applied to diode 102 by the R.-C. combination, diode 102 conducts current heavily and a large portion of the current flowing through diode 102 passes through condenser 100 because at this point that condenser is at least partially discharged. Under this condition resistor 101 is essentially short-circuited by the low impedance path presented by condenser 100 and the waveform of voltage appearing at terminal 103 is flattened off as shown at region 1, 3 of curve 120 in FIGURE 12. When the potential difference between terminals 11 and 13 falls in voltage magnitude below the clamping voltage established by the combination of resistor 101 and condenser 100, diode 102 ceases to conduct and the voltage waveform at terminal 103 becomes the remaining portion of the positive half-sine wave applied to terminal 11. This can be seen from curve 120.

Figure 11:
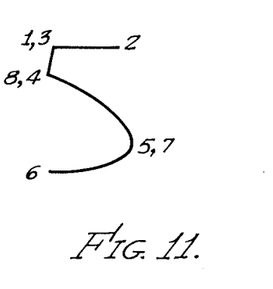
FIGURE 11 illustrates the steps occurring in the synthesis of the numeral "5."
Figure 12:
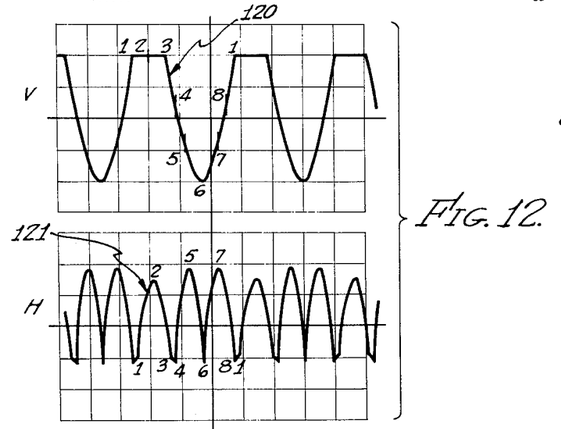
FIGURE 12 is a graphical representation of the voltage waveforms necessary to generate the numeral "5."

The circuit for generating the voltage waveform necessary for application to the horizontal deflection plates of an associated cathode ray tube in order to trace out the numeral "5" is more complex than that necessary for generating the vertical deflection voltage waveform. The horizontal deflection circuit, in one embodiment, involves four phase-shift circuits and one direct coupling circuit without phase shift. Specifically, in FIGURE 10 terminal 13 is connected through resistor 105 and diode 106 to horizontal deflection voltage output terminal 107. Obviously no phase shift is involved in this portion of the circuit and diode 106 permits only the positive half of the sine wave appearing at terminal 13 to appear at output terminal 107. Input terminals 11 and 13 are connected through the phase-shift network comprising resistor 108 and condenser 109 and through diode 110 to horizontal deflection voltage output terminal 107. Input terminals 11 and 13 are coupled through the second phase-shifting network comprising resistor 111 and condenser 112 and through resistor 113 and diode 114 to horizontal deflection voltage output terminal 107. Input terminals 11 and 13 are coupled through a third phase-shifting network comprising resistor 15 and condenser 116 and through resistor 117 and diode 118 to horizontal deflection voltage output terminal 107. A fourth phase-shifting network comprising resistor 119 and condenser 125 applies a fourth phase-shifted output voltage through diode 126 to horizontal deflection voltage output terminal 107. The waveform of the resulting voltage is shown in curve 121 of FIGURE 12. The steps by which the numeral "5" is generated are shown in FIGURE 11 and segments of the waveforms in FIGURE 12 corresponding to the segments of the numeral "5" in FIGURE 11 are given corresponding numbers. It is to be noted that the section 3, 4 in curve 121 of FIGURE 12 is a portion of a sine wave. Once again the path of the beam of the cathode ray tube retraces its original path to return to the initial point 1 rather than using blanking and a direct return.

Figure 13:
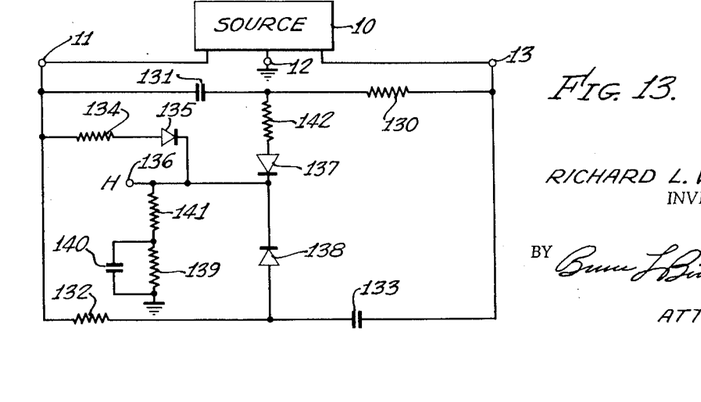
FIGURE 13 is a schematic diagram of an alternate circuit for generating the horizontal deflection voltage waveform required to generate the numeral "5."

An alternative and simplified form of the horizontal deflection voltage generating circuit is shown in FIGURE 13. In FIGURE 13 there are only two phase shifting circuits one comprising resistor 130 and condenser 131 and the other comprising resistor 132 and condenser 133, each network being connected between terminals 11 and 13. In addition there is a path from terminal 11 through resistor 134 and diode 135 to horizontal deflection voltage output terminal 136. The phase-shifted sine wave produced at the junction of resistor 130 and condenser 131 is coupled through resistor 142 and diode 137 to output terminal 136. The phase-shifted signal appearing at the junction between resistor 132 and condenser 133 is coupled through diode 138 to output terminal 136. Diodes 135, 137 and 138 are poled so that only the positive portions of the sine waves can reach output terminal 136. The network comprising resistor 139, condenser 140 and resistor 141 provides a biasing voltage to the diodes to delay their conduction until the applied sine waves have reached a positive potential exceeding such applied bias.

Figure 14:
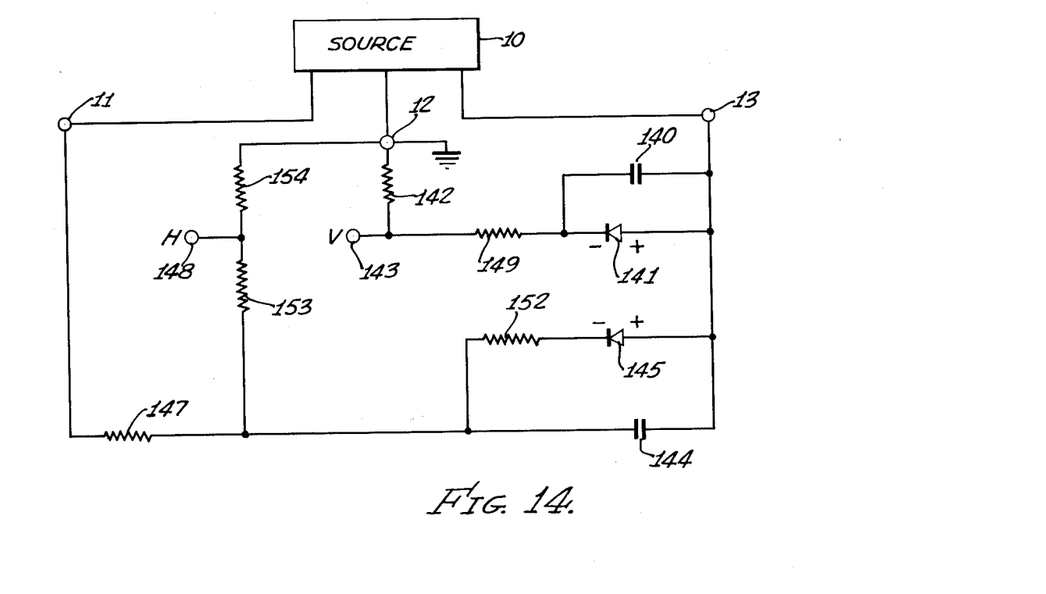
FIGURE 14 is a schematic diagram of the circuit for generating the horizontal and vertical voltage waveforms necessary to generate the numeral "7."
Figure 16:
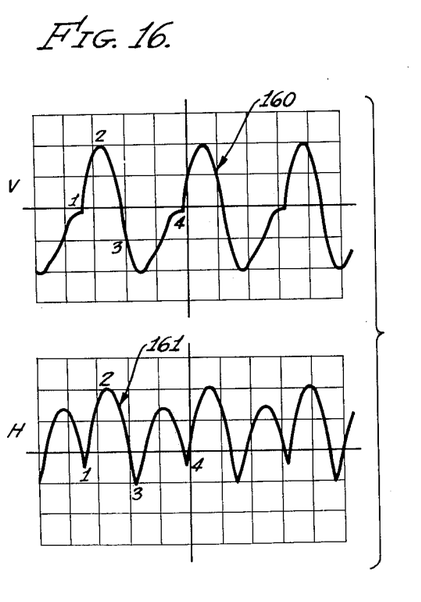
FIGURE 16 is a graphical representation of the voltage waveforms generated by the circuit of FIGURE 14.

In FIGURE 14 the sine wave potential appearing between terminals 12 and 13 is applied across a network comprising condenser 140 shunted by diode 141, this combination being in series with resistors 142 and 149. The resistors 142 and 149 may be merely parts of a single resistor, such as a potentiometer. Vertical deflection output voltage is taken from terminal 143 which is connected to the junction between resistor 142 and resistor 149. Diode 141 is poled so that when the potential appearing at terminal 13 is positive, the diode conducts, short-circuiting condenser 140 and applying a positive half-sine wave of voltage to terminal 143. When the potential at terminal 13 is negative, diode 141 appears as an open circuit and the combination of condenser 140 in series with resistors 142 and 149 produces a phase-shifted output voltage at terminal 143. The resultant waveform is shown in curve 160 of FIGURE 16.

Figure 15:
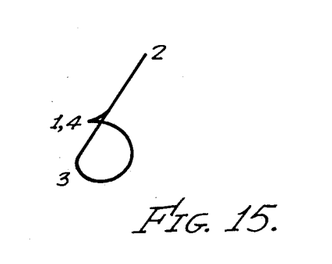
FIGURE 15 is a step-by-step analysis of the fashion in which the numeral "6" is generated.

A network comprising condenser 144 shunted by diode 145 and resistor 152, that combination being in series with resistor 147, is shunted between terminals 11 and 13 to generate the horizontal deflection voltage at horizontal output terminal 148, which is connected to the junction between resistors 153 and 154. When terminal 13 is positive with respect to terminal 11, diode 145 conducts short-circuiting condenser 144 and applying a positive half-sine wave of voltage to output terminal 148 through the voltage divider network comprising resistors 153 and 154. When terminal 13 is negative with respect to terminal 11, diode 145 is open-circuited and a phase-shifted voltage with a D.-C. component in it is applied to terminal 148. The composite waveform appearing at terminal 148 is shown in curve 161 of FIGURE 16. The segments in the vertical and horizontal voltage waveforms which produce the various segments of the numeral "6" are given identical numbers. For example, segment 1, 2 which is in the upper portion of the numeral "6" is formed by the in-phase rising sine wave curve segments 1, 2 in curves 160 and 161. The straight line portion 2, 3 of the numeral "6" in FIGURE 15 is formed by the in-phase sine wave segment 2, 3 in curves 160 and 161. The loop 3, 4 is formed by phase-shifted components 3, 4 from curves 160 and 161.

Purely by way of example, the components shown in the circuit of FIGURE 14 may have the following values:

Condenser 140 _____________ .005 mfd.
Resistor 149 ______________ 120,000 ohms.
Resistor 142 ______________ 47,000 ohms.
Diode 141 ________________ Type 1N222.
Resistor 147 ______________ 100,000 ohms.
Resistor 153 ______________ 150,000 ohms.
Resistor 154 ______________ 100,000 ohms.
Resistor 152 ______________ 15,000 ohms.
Condenser 144 _____________ .005 mfd.
Diode 145 ________________ Type 1N222.
Source 10 ________________ 60 cycle sine wave center-tapped source.

Figure 17:
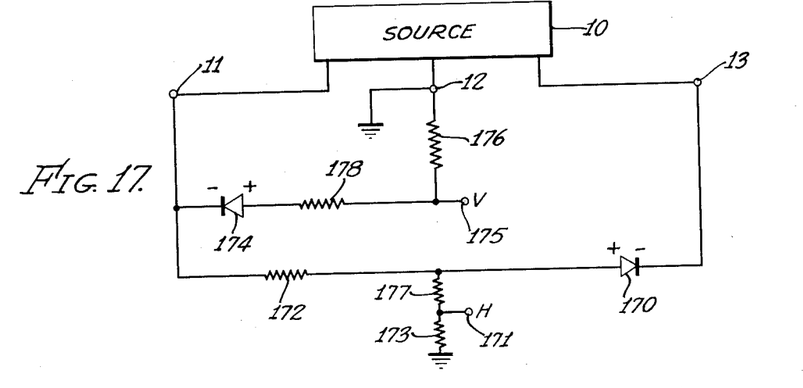
FIGURE 17 is a schematic diagram of the circuit for generating the voltage waveforms necessary to generate the numeral "7."

Turning now to FIGURE 17, output voltage from terminal 13 of source 10 is applied through diode 170 and resistor 177 to horizontal deflection voltage output 171. Output voltage from terminal 11 is applied through resistor 172 and resistor 177 to the output terminal 171. Resistor 173 provides a ground return circuit. When terminal 13 is positive with respect to terminal 11, diode 170 is cut off by reason of its orientation in the circuit. As a result, a voltage appears at output terminal 171 which is equal to the voltage at terminal 11 multiplied by the ratio between the resistance of resistor 173 and the total resistance of resistors 172, 177 and 173. This is a negative half-sine wave of reduced amplitude as may be seen from curve 190, segment 3, 4 in FIGURE 19. When terminal 13 is negative with respect to terminal 11, diode 170 conducts connecting terminal 13 to output terminal 171 through the divider network comprising resistors 177 and 173. This produces the negative half-sine wave of voltage of increased amplitude shown at segment 1, 3 of curve 190 in FIGURE 19.

Figures 18, 19:
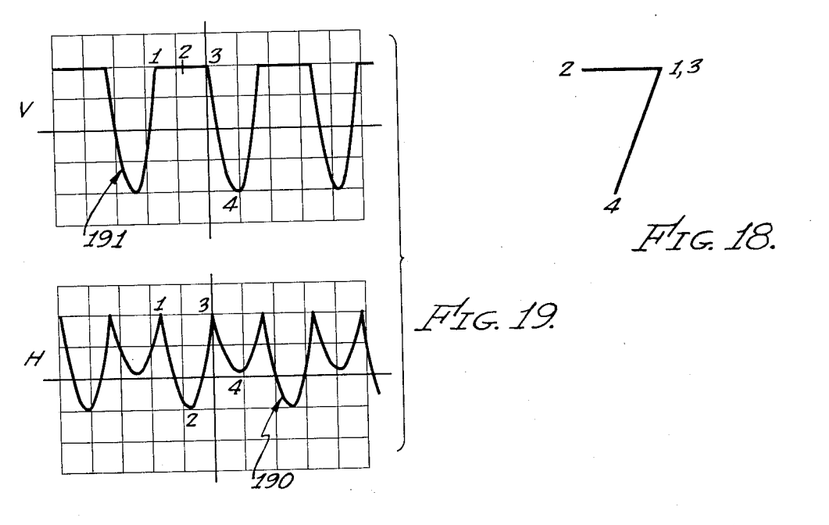
FIGURE 18 is a step-by-step analysis of the fashion in which the numeral "7" is generated.
FIGURE 19 is a graphical representation of the voltage waveforms generated by the circuit of FIGURE 17.

In the vertical deflection voltage generation circuit terminal 11 is connected through resistor 178 and diode 174 to vertical deflection voltage output terminal 175 and through resistor 176 to terminal 12 which is grounded. When the voltage at terminal 11 is positive with respect to ground diode, 174 is cut off by reason of its unilateral conducting nature and its orientation in the circuit. No output voltage appears at terminal 175, as is indicated at segment 1, 3 in curve 191 of FIGURE 19. When terminal 11 exhibits a voltage which is negative with respect to ground, diode 174 is caused to conduct connecting terminal 11 to output terminal 175 through resistor 178 and producing a negative half-sine wave of voltage at that output terminal 175. This may be seen graphically in segment 3, 1 of curve 191 in FIGURE 19. The correlation between various segments of the voltage waveforms shown in curves 190 and 191 and the numeral "7" as generated on the screen of an associated cathode ray tube is shown in FIGURE 18 in which segments of the numeral are numbered in accordance with the corresponding sections or segments of the curves in FIGURE 19. The section 1, 2 in FIGURE 18 is a horizontal straight line formed by zero deflection voltage on the vertical deflection plates of the cathode ray tube and the negative half-sine wave shown at segment 1, 3 in curve 190 in FIGURE 19. The section 3, 4 of the numeral "7" is formed by the in-phase negative half-sine waves shown at segments 3, 1 in curves 190 and 191 of FIGURE 19. This diagonal line in FIGURE 18 has a slope dependent upon the relative amplitude of the two negative half-sine waves generated for application to the horizontal and vertical deflection plates of an associated cathode ray tube.

Purely by way of example, the components shown in FIGURE 17 may have the following values:

Resistor 176 ______________ 120,000 ohms.
Resistor 178 ______________ 180,000 ohms.
Diode 174 ________________ Type 1N222.
Resistor 172 ______________ 220,000 ohms.
Resistor 173 ______________ 100,000 ohms.
Resistor 177 ______________ 270,000 ohms.
Diode 170 ________________ Type 1N222.
Source 10 ________________ 60 cycle sine wave center-tapped source with a terminal voltage dependent upon the deflection voltage necessary in the associated cathode ray tube.

Figure 20:
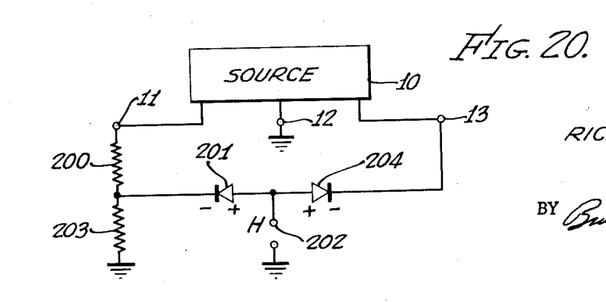
FIGURE 20 is an alternative schematic diagram of a circuit for developing the horizontal voltage waveforms necessary to generate the number "7."

An alternate circuit for generating the voltage waveform necessary, in combination with the appropriate vertical deflection waveform to produce the numeral "7" on the screen of an associated cathode ray tube is shown in FIGURE 20. In that figure terminal 11 is connected through resistor 200 and diode 201 to horizontal deflection voltage output terminal 202. Resistor 203 in combination with resistor 200 forms a voltage divider network which determines the amplitude of the potential applied to diode 201. Terminal 13 is connected through diode 204 to output terminal 202. When terminal 11 carries a positive potential, diode 201 is cut off and none of the potential from terminal 11 is applied to terminal 202. At the same time that terminal 11 is positive, terminal 13 is negative which applies a potential to diode 204 in a forward direction producing conduction in that diode and essentially connecting terminal 13 directly to horizontal deflection voltage output terminal 202. In the next half-cycle of the sine wave signal applied from source 10 to input terminal 11 is negative causing diode 201 to conduct and producing a negative sine wave of reduced amplitude at output terminal 202. The output voltage amplitude is determined by the relative size of resistors 200 and 203. By this technique curve 190 of FIGURE 19 can be produced at the output terminals 202.

Figure 21:
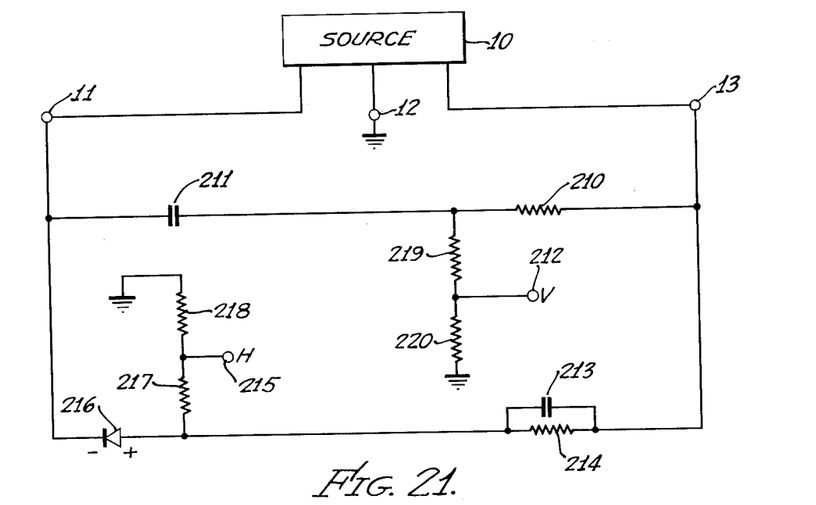
FIGURE 21 is a schematic diagram of the circuit for generating the voltage waveforms necessary to generate the numeral "8."
Figure 23:
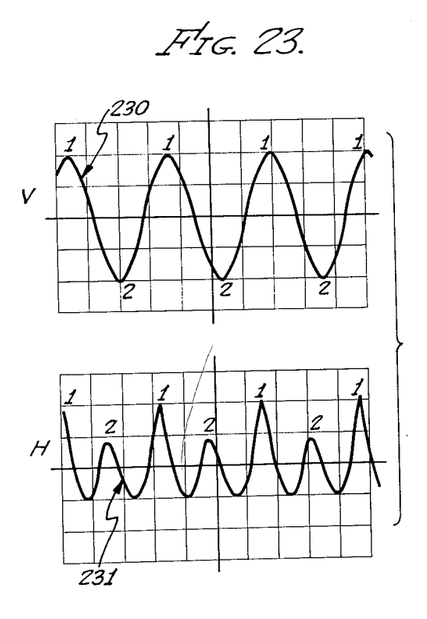
FIGURE 23 is a graphical representation of the voltage waveforms generated by the circuit of FIGURE 21.

The vertical and horizontal deflection voltage generating circuits for producing a numeral "8" on an associated cathode ray tube are shown in FIGURE 21. In FIGURE 21 a phase-shifting network producing approximately 90° phase shift and comprising resistor 210 and condenser 211 is connected between terminals 11 and 13. Phase-shifted voltage is taken at the junction between condenser 211 and resistor 210 to provide the vertical deflection voltage waveform required to generate the numeral "8." This voltage appears at output terminal 212. It may be reduced to a desired level by a potentiometer or voltage divider comprising resistors 219 and 220. Terminal 13 is connected through a clamping or biasing network comprising condenser 213 and resistor 214 to horizontal deflection voltage output terminal 215 and through diode 216 to terminal 11. The vertical deflection voltage appearing at terminal 212 is phase shifted with respect to the voltages appearing between either terminal 11 or terminal 13 and ground terminal 12 by reason of the series connection of condenser 211 and resistor 210. Its amplitude may be reduced by a potentiometer or voltage divider comprising resistors 217 and 218. The amount of phase shift of the potential appearing at output terminal 212 is approximately 90°. This can be seen quite clearly from curve 230 in FIGURE 23. It is to be noted that point 1 on curve 230 is at the 90° point on the sine wave curve.

Figure 22:
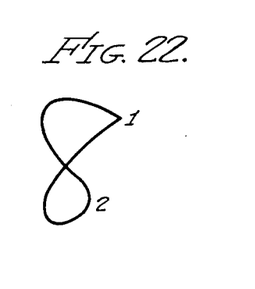
FIGURE 22 is a step-by-step analysis of the fashion in which the numeral "8" is generated.

When terminal 11 has a positive potential appearing thereon, diode 216 is cut off and the negative half-sine wave appearing at terminal 13 appears at output terminal 215 (its amplitude being reduced if the voltage divider network is included), the condenser 213 being partially discharged at the beginning of this half-cycle and attaining a certain amount of charge during the half-cycle. During the next half-cycle of the sine wave from source 10, terminal 13 exhibits a rising positive potential which is offset partially by the bias developed across resistor 214 during the discharge of condenser 213. When the positive potential at terminal 13 in conjunction with the negative potential appearing at terminal 11 is sufficient to overcome the bias generated across resistor 214, diode 216 conducts applying the negative half-sine wave voltage from terminal 11 to output terminal 215. The combination of resistor 214 and condenser 213 produces the rounding off in the region of point 2 on waveform curve 231 of FIGURE 23. The segments 1, 2 and 2, 1 in FIGURE 22 are formed by correspondingly numbered segments 1, 2 and 2, 1 in curves 230 and 231 of FIGURE 23.

Purely by way of example, the components shown in the circuit of FIGURE 21 may have the following values:

Resistor 210 _____________________ 470,000 ohms.
Condenser 211 ___________________ 0.02 mfd.
Resistor 212 _____________________ 270,000 ohms.
Resistor 220 _____________________ 82,000 ohms.
Resistor 214 _____________________ 47,000 ohms.
Condenser 213 ___________________ 0.02 mfd.
Resistor 217 _____________________ 680,000 ohms.
Resistor 218 _____________________ 680,000 ohms.
Diode 216 _______________________ Type 1N222.
Source 10 _______________________ 60 cycle sine wave center-tapped A.-C. source.

Figure 24:
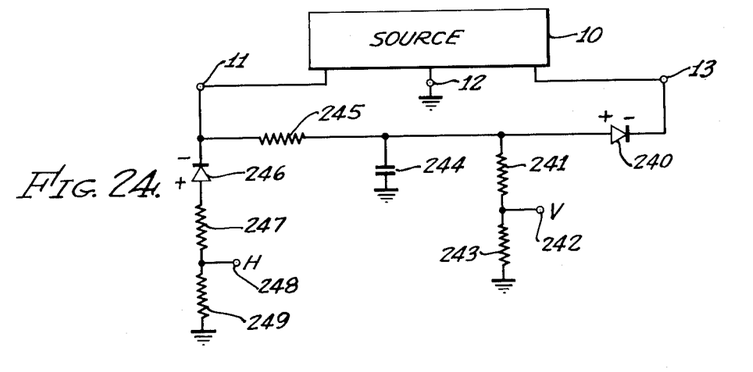
FIGURE 24 is a schematic diagram of the circuit for generating the numeral "9."
Figure 26:
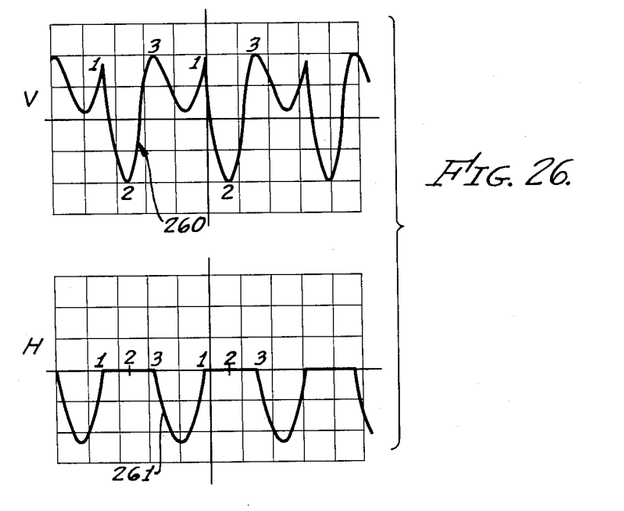
FIGURE 26 is a graphical representation of the voltage waveforms generated by the circuit of FIGURE 24.

In FIGURE 24 terminal 13 is connected through diode 240 and resistor 241 to vertical deflection voltage output terminal 242 which, in turn, is returned to ground through resistor 243. Condenser 244 shunts the combination of resistors 241 and 243. The ungrounded terminal of condenser 244 is connected through resistor 245 to terminal 11. When terminal 11 is negative with respect to ground, diode 240 is cut off and a phase-shifted negative portion of a sine wave appears at output terminal 242. When terminal 13 is negative with respect to terminals 11 and 12, diode 240 conducts connecting terminal 13 to vertical deflection voltage output terminal 242 through resistor 241 which is in series with resistor 243. Condenser 244 attains a positive charge during this process which results in displacing positively the zero axis of both the phase-shifted and unphase-shifted half-sine waves appearing at output terminal 242. The effect of this D.-C. component is apparent from the curve 260 in FIGURE 26.

Figure 25:
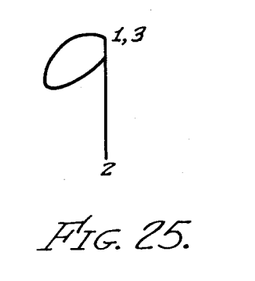
FIGURE 25 is a step-by-step analysis of the fashion in which the numeral "9" is generated.

Terminal 11 is connected through diode 246 and resistor 247 to horizontal deflection voltage output terminal 248, that terminal being returned to ground through resistor 249. When terminal 11 is negative, diode 246 conducts, placing at least a portion of the output voltage appearing at terminal 11 on output terminal 248. This is in the region 3, 1 of curve 261 in FIGURE 26. When terminal 11 attains a positive potential, diode 246 is cut off and no output voltage appears at terminal 248. This is the region 1,3 in curve 261 of FIGURE 26. The numbered segments in FIGURE 25 are formed by the segments of curves 260 and 261 which have corresponding numbers. Hence, the substantially vertical line in the numeral "9" is formed by the segments 1, 2, 3 in curves 260 and 261. It will be noted that the horizontal voltage is constant during this period and there is merely a varying vertical voltage which sweeps out the vertical line portion of the numeral "9." As has been indicated, the negative portion of the sine wave appearing at segment 3, 1 in the vertical deflection voltage waveform of curve 260 is out of phase with the negative portion of the sine wave in the horizontal deflection voltage waveform of curve 261, region 3, 1. This produces the loop portion of the numeral "9."

Purely by way of example, the components shown in FIGURE 24 may have the following values:

Resistor 245 _______________ 150,000 ohms.
Condenser 244 _____________ 0.015 mfd.
Resistor 241 _______________ 150,000 ohms
Resistor 243 _______________ 330,000 ohms
Diode 240 _________________ Type 1N222
Resistor 247 _______________ 100,000 ohms
Resistor 249 _______________ 330,000 ohms
Diode 246 _________________ Type 1N222
Source 10 _________________ 60 cycle sine wave center-tapped source FIGURE 27 discloses the circuit for generating the numeral "0" on an associated cathode ray tube screen. A phase-shifting network comprising resistor 270 and condenser 271 is shunted between terminals 13 and 11. The vertical deflection voltage is taken from the junction of resistors 272 and 273 which are series connected between the junction of resistor 270 and condenser 271 and ground.

Figure 27:
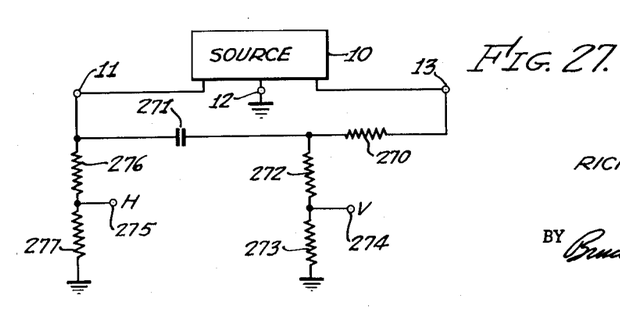
FIGURE 27 is a schematic diagram of the circuit for generating the numeral "0."

The horizontal deflection voltage is taken from output terminal 275 which is connected to the voltage divider comprising resistor 276 and resistor 277 series connected between terminal 11 and ground. Approximately 90° of phase shift exists between the voltage appearing at vertical deflection voltage output terminal 274 and the voltage appearing at horizontal deflection voltage output terminal 275. The application of these two voltages to their respective deflection plates on an associated cathode ray tube will generate the numeral "0."

Purely by way of example, the components used in FIGURE 27 may have the following values:

Condenser 271 __________________ 0.02 mfd.
Resistor 270 ____________________ 150,000 ohms
Resistor 272 ____________________ 220,000 ohms
Resistor 273 ____________________ 68,000 ohms
Resistor 276 ____________________ 220,000 ohms
Resistor 277 ____________________ 33,000 ohms Generation of the numeral "1" is a simple matter of connecting output terminals 12 and 13 to the vertical deflection plates of the associated cathode ray tube and applying no deflection voltage to the horizontal deflection plates.

Thus, there have been provided by this invention circuits utilizing passive elements only supplied from a single, multi-phase single frequency energy source to generate deflection voltages, which, upon application to the horizontal and vertical deflection plates of an associated cathode ray tube, produce on the screen thereof any numeral between 0 and 9.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Apparatus for generating voltages which, when applied to a conventional cathode ray tube, produce characters on the screen of the cathode ray tube, including: first, second and third sine wave current input terminals, said first input terminal being adapted for connection to a source of potential of a first phase, said third input terminal being adapted for connection to a source of potential of a second phase, and said second terminal being adapted for connection to a source of reference potential common to said potentials of said first and second phases; a vertical deflection circuit coupled to said first, second and third sine wave current input terminals, said vertical deflection circuits including passive electrical elements only and having a pair of vertical deflection voltage output terminals adapted for connection to vertical deflection means on an associated cathode ray tube; and a horizontal deflection circuit coupled to said first, second and third sine wave input terminals, said horizontal deflection circuits including passive electrical elements only and having a pair of horizontal deflection voltage output terminals adapted for connection to the horizontal deflection means of an associated cathode ray tube.

2. Apparatus according to claim 1 in which said passive electrical elements include no elements other than resistors, condensers and diodes.

3. Apparatus according to claim 1 in which said first and second phases differ by 180°.

4. Apparatus according to claim 1 in which said vertical deflection circuit includes means for clamping a voltage at a predetermined level.

5. Apparatus according to claim 1 in which said horizontal deflection circuit includes at least one phase-shifting network.

6. Apparatus according to claim 1 in which said vertical deflection circuit includes at least one phase-shifting network.

7. Apparatus according to claim 2 in which said vertical deflection circuit includes means for clamping a voltage at a predetermined level.

8. Apparatus according to claim 2 in which said vertical deflection circuit includes at least one phase-shifting network.

9. Apparatus according to claim 2 in which said horizontal deflection circuit includes at least one phase-shifting network.

10. Apparatus according to claim 2 in which said horizontal deflection circuit includes means for clamping a voltage at a predetermined level.

11. Apparatus according to claim 1 in which said vertical deflection circuit includes a diode.

12. Apparatus according to claim 1 in which said horizontal deflection circuit includes a diode.

13. Apparatus for generating voltages which when applied to a conventional cathode ray tube produce the numeral "3" on the screen of the cathode ray tube, including: first, second and third sine wave current input terminals, said second input terminal being connected to a reference potential; a vertical deflection voltage generating circuit having an output terminal adapted for connection to the ungrounded vertical deflection plate of an associated cathode ray tube; first, second and third and fourth resistors series-connected between said first input terminal and said second input terminal, a condenser connected between the junction of said first and second resistors and reference potential, and a diode shunting said second resistor and being poled to conduct current only when said first terminal is negative with respect to said second terminal, said vertical deflection voltage output terminal being coupled to the terminal of said second resistor remote from said first resistor; a horizontal deflection voltage generating circuit having an output terminal adapted for connection to the ungrounded horizontal deflection plate of an associated cathode ray tube; first and second phase-shifting networks coupled between said first and third input terminals and each comprising a resistor and a condenser, series-connected; a diode coupling the junction between each series-connected resistor and condenser to a common connection; a series-connected diode and resistor coupled between said first input terminal and said common connections; a series-connected diode and resistor coupled between said third input terminal and said common connection; and a horizontal deflection voltage output terminal coupled to said common connection.

14. Apparatus for generating voltages which when applied to a conventional cathode ray tube produce the numeral "3" on the screen of the cathode ray tube, including: first, second and third sine wave current input terminals, said second input terminal being connected to a reference potential; a vertical deflection voltage generating circuit having an output terminal adapted for connection to the ungrounded vertical deflection plate of an associated cathode ray tube; a phase-shifting network coupled between said first input terminal and said vertical deflection voltage output terminal, and a diode shunting at least a portion of said phase-shifting network and poled to short circuit such portion when the polarity of the potential on said first input potential is negative with respect to said reference potential; a horizontal deflection voltage generating circuit having an output terminal adapted for connection to the ungrounded horizontal deflection plate of an associated cathode ray tube; first and second phase-shifting networks coupled between said first and third input terminals and each comprising a resistor and a condenser, series-connected; a diode coupling the junction between each series-connected resistor and condenser to a common connection; a series-connected diode and resistor coupled between said first input terminal and said common connection; a series-connected diode and resistor coupled between said third input terminal and said common connection; and a horizontal deflection voltage output terminal coupled to said common connection.

15. Apparatus for generating voltages which, when applied to a conventional cathode ray tube, produce the numeral "6" including: first, second and third sine wave current input terminals, said second input terminal being connected to a reference potential; a vertical deflection voltage generating circuit having an output terminal adapted for connection to the ungrounded vertical deflection plate of an associated cathode ray tube, a phase-shifting network comprising a first resistor and a first condenser coupled between said first input terminal and said second input terminal, said vertical deflection voltage output terminal being coupled to the junction between said resistor and condenser, and a diode shunting said condenser and poled to conduct electrical current when said first input terminal is positive with respect to said second input terminal; and a horizontal deflection voltage generating circuit including a second condenser and a second resistor series-connected between said first and third input terminals, a diode coupled in shunting relationship to said second condenser and poled to conduct electrical current when the potential of said first terminal is positive with respect to said reference potential, and an output terminal coupled to the junction of said series-connected second condenser and second resistor.

16. Apparatus for generating voltages which, when applied to a conventional cathode ray tube, produce the numeral "7" including: first, second and third sine wave current input terminals, said second input terminal being connected to a reference potential; a vertical deflection voltage generating circuit having an output terminal adapted for connection to the ungrounded vertical deflection plate of an associated cathode ray tube, a diode coupled between said third input terminal and said vertical deflection voltage output terminal and poled to conduct electrical current when the potential of said third input terminal is negative with respect to said reference potential; a horizontal deflection voltage generating circuit including a diode and a resistor connected in series and coupled between said first and third input terminals, said diode being poled to conduct electrical current only when the potential of said first terminal is negative with respect to ground, and a horizontal deflection voltage output terminal coupled to the junction between said diode and said resistor.

17. Apparatus for generating voltages which, when applied to a conventional cathode ray tube, produce the numeral "8" including: first, second and third sine wave current input terminals, said second input terminal being connected to a reference potential; a vertical deflection voltage generating circuit having an output terminal adapted for connection to the ungrounded vertical deflection plate of an associated cathode ray tube, a phase-shifting network including a resistor and a condenser connected in series and coupled between said first and third input terminals, said vertical deflection voltage output terminal being coupled to the junction between said resistor and said condenser; and a horizontal deflection voltage generating circuit including a second resistor and a diode connected in seres and coupled between said first and third input terminals, said diode being poled so that it conducts electrical current only when the potential of said third input terminal is negative with respect to said reference potential, a condenser shunting said second resistor, and a horizontal deflection voltage output terminal coupled to the junction between said second resistor and said diode.

18. Apparatus for generating voltages which, when applied to a conventional cathode ray tube, produce the numeral "9" including: first, second and third sine wave current input terminals, said second input terminal being connected to a reference potential; a vertical deflection voltage generating circuit having an output terminal adapted for connection to the ungrounded vertical deflection plate of an associated cathode ray tube, a diode coupled beween said first input terminal and said vertical deflection voltage output terminal, said diode being poled to conduct electrical current only when the potential of said first input terminal is negative with respect to said reference potential, a phase-shifting network including a resistor and a condenser series-connected and coupled between said third input terminal and said reference potential, said vertical deflection voltage output terminal being coupled to the junction between said resistor and said condenser; a horizontal deflection voltage generating circuit including a horizontal deflection voltage output terminal and a diode coupled between said third input terminal and said horizontal deflection voltage output terminal, said diode being poled to conduct electrical current only when the potential of said third input terminal is negative with respect to said reference potential.

References Cited in the file of this patent

UNITED STATES PATENTS

| | | |
|---|---|---|
| 2,402,989 | Dickinson | July 2, 1946 |
| 2,552,761 | Baker | May 15, 1951 |
| 2,594,731 | Connolly | Apr. 29, 1952 |
| 2,774,932 | Patton | Dec. 18, 1956 |
| 2,798,153 | Dougherty | July 2, 1957 |
| 2,803,815 | Wulfsberg | Aug. 20, 1957 |
| 2,837,652 | Nailen | June 3, 1958 |
| 2,842,664 | Martin | July 8, 1958 |
| 2,903,615 | Hoffman | Sept. 8, 1959 |

OTHER REFERENCES

"Generating Characters," Perry et al., Electronics, Jan. 3, 1958, pp. 72 to 75.